(12) United States Patent
Liebel et al.

(10) Patent No.: US 9,005,061 B2
(45) Date of Patent: Apr. 14, 2015

(54) TENSIONING DEVICE

(75) Inventors: Thorsten Liebel, Fürth (DE); Bernd Hartmann, Weisendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 13/696,173

(22) PCT Filed: Apr. 4, 2011

(86) PCT No.: PCT/EP2011/055154
§ 371 (c)(1),
(2), (4) Date: Jan. 14, 2013

(87) PCT Pub. No.: WO2011/138101
PCT Pub. Date: Nov. 10, 2011

(65) Prior Publication Data
US 2013/0116073 A1    May 9, 2013

(30) Foreign Application Priority Data
May 3, 2010    (DE) .......................... 10 2010 019 054

(51) Int. Cl.
*F16H 7/12*    (2006.01)
*F16H 7/00*    (2006.01)
*F16H 7/10*    (2006.01)

(52) U.S. Cl.
CPC ................ *F16H 7/10* (2013.01); *F16H 7/1218* (2013.01)

(58) Field of Classification Search
CPC .................................. F16H 7/10; F16H 7/1218
USPC .......................................... 474/112, 133, 135
See application file for complete search history.

(56) References Cited

U.S. PATENT DOCUMENTS

| 4,557,707 A | | 12/1985 | Thomey | |
|---|---|---|---|---|
| 4,689,037 A | * | 8/1987 | Bytzek | ........................ 474/135 |
| 4,834,694 A | * | 5/1989 | Martin | ........................ 474/135 |
| 4,872,768 A | * | 10/1989 | Brandenstein et al. | ....... 384/223 |
| 5,236,396 A | * | 8/1993 | Golovatai-Schmidt et al. | ............................ 474/101 |
| 5,288,276 A | * | 2/1994 | Golovatgai-Schmidt et al. | ............................ 474/133 |

(Continued)

FOREIGN PATENT DOCUMENTS

| CN | 1516789 A | 7/2004 |
|---|---|---|
| CN | 101027505 A | 8/2007 |

(Continued)

*Primary Examiner* — Henry Liu
(74) *Attorney, Agent, or Firm* — Volpe and Koenig, P.C.

(57) ABSTRACT

A clamping device (1) of a traction mechanism drive, comprising a fixedly positioned base part (2), with which a pivot arm (3) is associated. The pivot arm (3) can be pivoted via a rotary bearing, consisting of a hub (9), a pin (5) of the base part (2) and a sliding bearing (10). A spring means (12) inserted between the base part (2) and the pivot arm (3) exerts an expansion force and effects a non-positive support of a tensioning roller (11) that is connected to the pivot arm (3) on a traction mechanism. In order to damp adjusting movements of the pivot arm (3), a damping device (13) is provided, which comprises two separate spring-loaded friction elements. For this purpose, a friction disk (14) is supported with form fit on the supporting disk (8) connected to the pin (5) of the base part (2) and with friction fit on the pivot arm (3). The damping device (13) further comprises a friction ring (17), which is fixed to the pivot arm (3) and is supported with friction fit on an inner wall (19) of the crucible-shaped base part (2) and which directly cooperates with the spring means (12).

13 Claims, 4 Drawing Sheets

(56) References Cited

U.S. PATENT DOCUMENTS

| | | | |
|---|---|---|---|
| 5,391,119 A * | 2/1995 | Kondo et al. | 474/112 |
| 5,449,328 A * | 9/1995 | Schmidt et al. | 474/135 |
| 5,458,541 A * | 10/1995 | Adler et al. | 474/135 |
| 5,503,599 A * | 4/1996 | Brehler et al. | 474/112 |
| 5,599,245 A * | 2/1997 | Giese | 474/135 |
| 5,647,813 A * | 7/1997 | Serkh | 474/135 |
| 5,702,314 A * | 12/1997 | Schmid | 474/94 |
| 5,718,649 A * | 2/1998 | Hong et al. | 474/91 |
| 5,964,674 A * | 10/1999 | Serkh et al. | 474/109 |
| 6,422,962 B1 * | 7/2002 | Lehtovaara et al. | 474/101 |
| 6,422,963 B2 * | 7/2002 | Kurose | 474/101 |
| 6,468,172 B1 * | 10/2002 | Lang et al. | 474/135 |
| 6,565,468 B2 * | 5/2003 | Serkh | 474/135 |
| 6,582,332 B2 * | 6/2003 | Serkh | 474/135 |
| 6,592,482 B2 * | 7/2003 | Serkh | 474/135 |
| 6,609,988 B1 * | 8/2003 | Liu et al. | 474/133 |
| 7,004,863 B2 * | 2/2006 | Serkh et al. | 474/109 |
| 7,217,207 B1 * | 5/2007 | Hallen | 474/135 |
| 7,273,432 B2 * | 9/2007 | Schonmeier et al. | 474/135 |
| 7,371,199 B2 * | 5/2008 | Joslyn | 474/135 |
| 7,850,561 B2 * | 12/2010 | Wilhelm et al. | 474/135 |
| 7,951,030 B2 * | 5/2011 | Ward et al. | 474/135 |
| 7,993,226 B2 * | 8/2011 | Mack et al. | 474/135 |
| 8,038,555 B2 * | 10/2011 | Pendergrass et al. | 474/135 |
| 8,118,698 B2 * | 2/2012 | Guhr | 474/135 |
| 8,277,348 B2 * | 10/2012 | Lannutti | 474/135 |
| 8,403,785 B2 * | 3/2013 | Lannutti | 474/135 |
| 8,517,873 B2 * | 8/2013 | Liebel et al. | 474/133 |
| 8,678,965 B2 * | 3/2014 | Ishida et al. | 474/113 |
| 2001/0024985 A1 * | 9/2001 | Kurose | 474/101 |
| 2004/0053719 A1 * | 3/2004 | Gibson | 474/112 |
| 2004/0072643 A1 * | 4/2004 | Berndt et al. | 474/135 |
| 2005/0146127 A1 * | 7/2005 | Schonmeier et al. | 280/806 |
| 2005/0181902 A1 * | 8/2005 | Konanz | 474/135 |
| 2006/0079360 A1 * | 4/2006 | Jung et al. | 474/135 |
| 2008/0125260 A1 * | 5/2008 | Wilhelm et al. | 474/135 |
| 2008/0280713 A1 | 11/2008 | Fischer | |
| 2009/0181815 A1 * | 7/2009 | Guhr | 474/135 |
| 2009/0321211 A1 * | 12/2009 | Mack et al. | 192/70.17 |
| 2010/0081529 A1 * | 4/2010 | Liebel et al. | 474/133 |
| 2010/0113201 A1 * | 5/2010 | Lannutti | 474/135 |
| 2010/0144473 A1 * | 6/2010 | Ward et al. | 474/112 |

FOREIGN PATENT DOCUMENTS

| | | |
|---|---|---|
| CN | 101300438 A | 11/2008 |
| CN | 101421541 A | 4/2009 |
| DE | 4414213 | 10/1995 |
| DE | 10248352 | 4/2004 |
| DE | 102006004544 | 8/2007 |
| DE | 202008007800 | 10/2009 |
| GB | 9209454 | 9/1992 |
| GB | 2377981 | 1/2003 |
| JP | 2003222211 A | 8/2003 |
| WO | 0238983 | 5/2002 |
| WO | 2010037232 | 4/2010 |
| WO | 2010041747 | 4/2010 |

* cited by examiner

TENSIONING DEVICE

FIELD OF THE INVENTION

The invention relates to a tensioning device that can automatically pre-tension a traction mechanism of a traction mechanism drive. The construction of this tensioning device comprises a base part that is fixed in position and a pivot arm that is allocated to this base part and can pivot about a rotary bearing on a pin of the base part. A spring means inserted between the base part and the pivot arm exerts an expansion force and further provides, in the operating state of the tensioning device, a non-positive support of a tensioning roller that is connected to the pivot arm on a traction mechanism. In order to damp adjusting movements of the pivot arm, a damping device is provided which comprises two separate spring-loaded friction elements. The damping device further includes a damping device that damps the adjusting movements of the pivot arm in the operating state.

BACKGROUND

Tensioning devices of this construction are advantageously used in belt drives for driving various assemblies of an internal combustion engine. The traction mechanism of such a traction mechanism drive is subjected to the alternating loads of the internal combustion engine due to the rotational imbalance produced by the combustion process in the internal combustion engine. For the traction mechanism drive, load conditions can occur that exceed the permissible limiting stress. The alternating loads of the traction mechanism produce deflections of the tensioning arm and these deflections are minimized by means of a damping device.

From DE 102 48 352 A1, a tensioning device is known that comprises a base part connected integrally to a pin that forms, together with a hub of the pivot arm and a sliding bearing, a rotary bearing. On the free end, a support disk that forms an axial stop for the spring-loaded pivot arm is allocated to the pin, wherein a friction disk is inserted between the support disk and the pivot arm. This friction disk forms a damping device for the tensioning device.

U.S. Pat. No. 4,557,707 discloses another tensioning device in which a compression spring constructed as a helical spring produces a tensioning force in the peripheral direction for generating a pre-tensioning force of the traction mechanism. The compressive force acting in the axial direction and produced by the spring means that applies a load on a friction disk is used as a damping device of the tensioning device.

SUMMARY

The objective of the present invention is to implement a compact, cost-optimized, and part-optimized tensioning device with high damping.

To meet this objective, the tensioning device according to the invention comprises a damping device that comprises two separate spring-loaded friction elements. A friction disk is fixed on a support disk connected to the pin of the base part. The pivot arm loaded by an axial force of the spring means is supported on this friction disk. The friction disk is fit with a friction-fit into an axial receptacle of the pivot arm. As another friction element, a friction ring is provided that surrounds one spring end of the spring means and is locked in rotation on the pivot arm and is supported with a friction-fit on an inner wall of the pot-shaped base part. By the use of this damping device according to the invention, a damping of ≥60% relative to the force of the spring means can be achieved. The Coulomb friction of the damping device is generated by the tangential force of the spring means constructed as a torsional spring on the friction ring and also by the axial force of the spring means on the pivot lever that is supported in the axial direction on the friction disk.

The individual friction elements are arranged so that these are integrated within the available installation space of the individual components of the tensioning device. Furthermore, neither the production nor the integration or installation of the friction ring and the friction disk in the tensioning device requires high costs, so that the functionally optimized tensioning device can be simultaneously realized in an economical way. The construction of the rotary bearing produces another cost advantage of the tensioning device according to the invention. This rotary bearing consists of a pin that is fixed, as a separate component, with one end on the base part and with the other end on the support disk. By eliminating the pin connected integrally to the base part, the production of the base part typically constructed as a cast part is simplified. The construction according to the invention further allows the use of a cost-optimized sliding bearing that consists of two sliding bearing bushings that are separated in the axial direction.

Other advantageous constructions of the invention are the subject matter of the dependent claims.

According to another construction of the invention it is provided that the friction disk of the damping device is locked in rotation by means of teeth with a positive-fit with the support disk. Advantageously, involute gearing or a Hirth coupling is used as spur gearing for this purpose. This gearing can achieve a certain radial compensation of coaxial errors caused, e.g., by the sliding bearing of the tensioning device.

On the side directed toward the pivot arm, the friction disk engages with at least one friction face that is directed in the radial direction or tapers conically and/or is directed in the axial direction in a correspondingly shaped axial receptacle of the pivot arm. For the purpose of adjusting or influencing the friction, the flank angles of a friction disk that forms an inside and an outside taper can be designed to match or deviate from each other.

The other friction ring belonging to the damping device and having a separating joint is supported in the installation state with a friction-fit on the inner wall of the housing due to the expansion force of the spring means by means of an essentially cylindrical lateral surface. Alternatively, a friction element or a friction ring with a joint could be used that is supported with at least one friction block supported by the expansion force of the spring means with a friction-fit on the inner wall of the housing.

The friction ring with a joint comprises a wedge that is directed inward in the radial direction and interacts, in the operating state, with a wedge surface of a projection of the pivot arm extending in the axial direction and a spring end of the spring means. This construction principle has the result that the wedge of the friction ring is displaced outward in the radial direction with increasing rotational angle of the pivot arm relative to the base part and the associated increased torsional force of the spring means. In connection with this, the friction ring is supported with an increased force on the inner wall of the base part, which advantageously produces increased damping.

PA 46 with a chemically linked PTFE additive is preferably suitable as the material for the friction disk and/or the friction ring. The PTFE additive can be adapted to the respective application. Furthermore, it is possible to use other plastics that fulfill the requirements with respect to the wear behavior and the friction as the material for the friction disk and/or the friction ring.

The pivot arm is connected in a pivoting manner by means of a hub to a sliding bearing on the pin to form a rotary bearing. The pin that is designed as a separate part and is fixed in position in the base part is advantageously constructed as a steel pin. The support disk is locked in rotation on the free end of this pin. Advantageously, the pin of the rotary bearing is fit in a corresponding sized bore of the base part and the support disk for creating a joint assembly with a centering pin and attached with a non-positive and/or material fit.

The individual parts of the rotary bearing, the base part, the pin, the pivot arm, and the support disk are produced according to the invention from the same or different materials. Consequently, a pin made from steel can be combined, e.g., with a base part and a pivot arm made from aluminum. To optimize the weight, the pin can be constructed as a hollow body with a bore.

In another construction according to the invention, the pivot arm on the side facing away from the base part is provided with a projection that extends in the axial direction and encloses the support disk on the outside while forming an annular gap. The projection extending in the axial direction is suitable for holding a sealing element, for example, a lip seal that is supported on the outer periphery of the support disk, which produces an effective sealing of the damping device.

Underscoring the installation space-optimized design of the tensioning device according to the invention, the tensioning roller positioned on the end of the pivot arm is positioned on the side directed toward the base part. This arrangement limits the axial installation space of the tensioning device essentially to the width of the base part and the pivot arm.

BRIEF DESCRIPTION OF THE DRAWINGS

The invention is explained in more detail with reference to embodiments shown in FIGS. 1 to 4. Shown are.

DETAILED DESCRIPTION OF THE PREFERRED EMBODIMENTS

Figure 1:
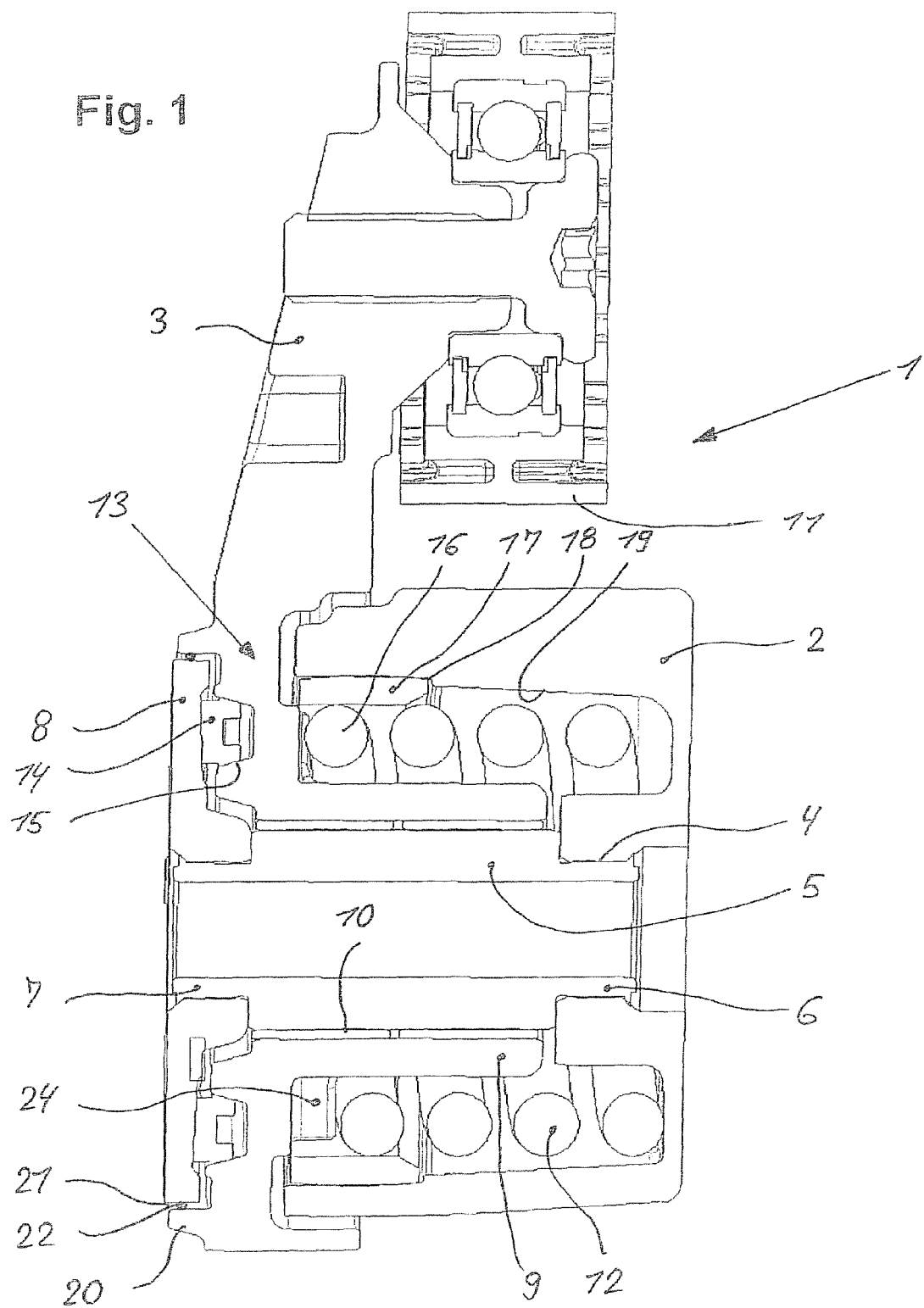
FIG. 1 a tensioning device according to the invention in a sectional view.

FIG. 1 shows a tensioning device 1 for a traction mechanism drive in a longitudinal section. The construction comprises a base part 2 that is fixed in position, for example, on the housing of an internal combustion engine, and a pivot arm 3 that is allocated to this base part. A receptacle 4 that is designed for a cylindrical pin 5 is formed centrally in the pot-shaped base part 2. The pin 5 has on each end a stepped end section 6, 7 each of which is inserted into a correspondingly sized bore of the receptacle 4 of the base part 2 and a support disk 8, respectively. By means of a bracing or a material-fit connection, in particular, welding, a durable fixing of the pin 5 is achieved on the base part 2 or the support disk 8. An adjustment lateral surface of the pin 5 between the receptacle 4 of the base part 2 and the support disk 8 is enclosed by a hub 9 of the pivot arm 3 that is arranged so that it can rotate about a sliding bearing 10 consisting of two sliding bearing bushings that are offset in the axial direction. The pivot arm 3 is used for holding a tensioning roller 11 that is positioned on the end on the side directed toward the base part 2 and contacts a traction mechanism not shown in FIG. 1 in the installed state by means of a spring force. For the non-positive support of the tensioning roller 11, a helical spring as the spring means 12 is inserted pre-tensioned between the base part 2 and the pivot arm 3. A torsional force of the spring means 12 provides the non-positive support of the tensioning roller 11 on the traction mechanism. Through the axial expansion force of the spring means 12, the pivot arm 3 is loaded in the direction of the support disk 8. For damping adjusting movements of the pivot arm 3 in the operating state, the tensioning device 1 comprises a damping device 13 that includes two friction elements. A first friction element forms the friction disk 14 that is fixed in rotation on the support disk 8 and engages with a mutual positive-fit in an annular receptacle 15 of the pivot arm 3. As the second friction element, a friction ring 17 is provided that interacts directly with a spring end 16 of the spring means 12 and is fixed in rotation on the pivot arm 3 and is supported on the outside by means of a lateral surface 18 on an inner wall 19 of the base part 2. Due to this arrangement, an adjustment movement of the pivot arm provides a synchronous relative movement of the friction ring 17 relative to the base part 2. The pivot arm 3 forms a collar 20 that projects in the axial direction and encloses the support disk 8 while forming an annular gap 21 set apart in the radial direction. A sealing element 22 inserted in the collar 20 provides an effective seal of the annular gap 21 and thus of the damping device 13.

Figure 2:
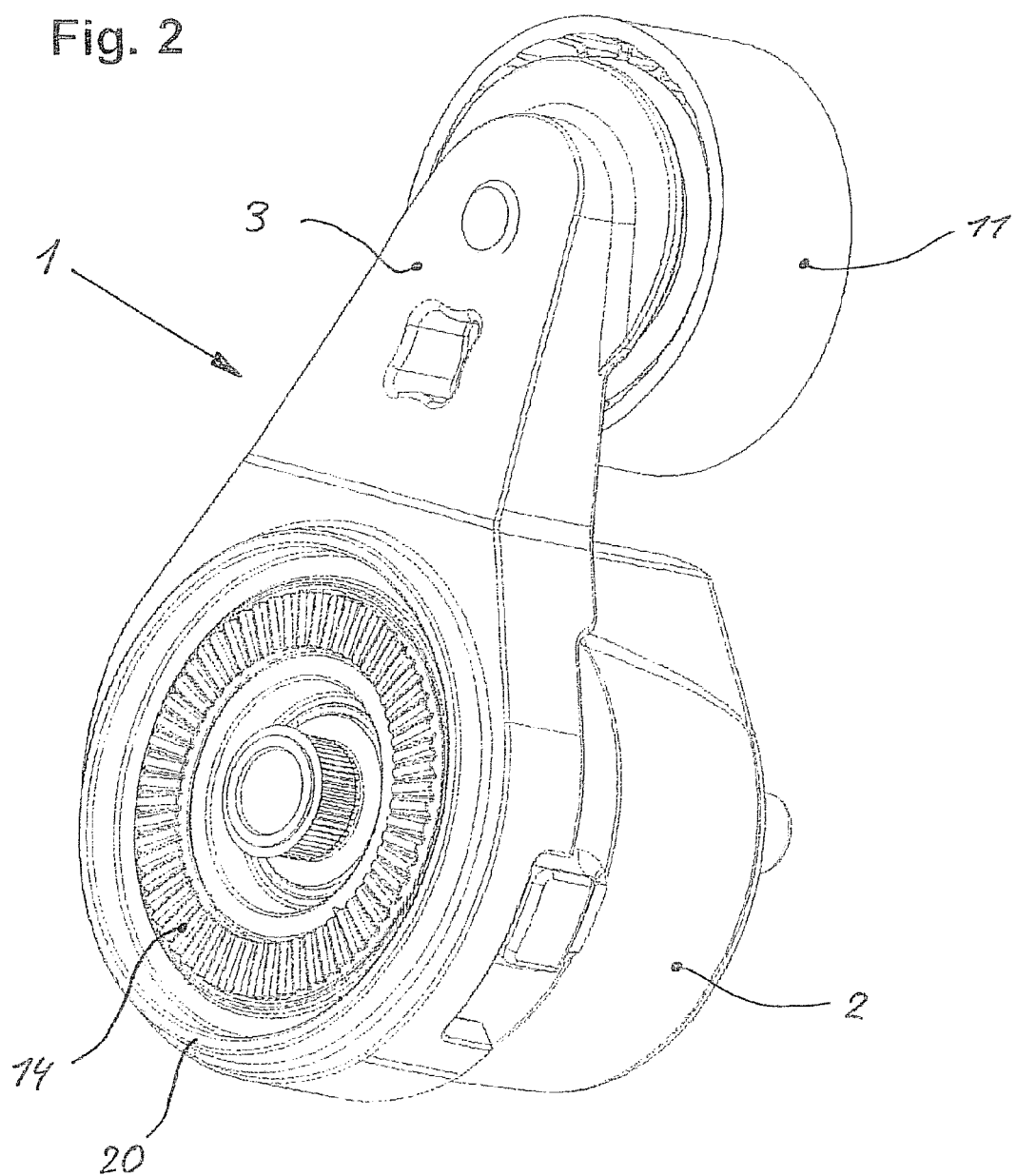
FIG. 2 the tensioning device according to FIG. 1 in a perspective view that shows the friction disk of the damping device, FIG. 3 the friction ring of the damping device in the installed state, and FIG. 4 a subsection of the tensioning device to show the damping device more clearly.

FIG. 2 shows the tensioning device 1 in a perspective view with a view of the pivot arm 3. The installation position of the friction disk 14 of the damping device 13 clearly shows the lack of the support disk 8. The friction disk 14 forms a circular ring-shaped gearing, in particular, a Hirth gearing, which engages with a positive-fit in a corresponding contact surface of the support disk 8.

Figure 3:
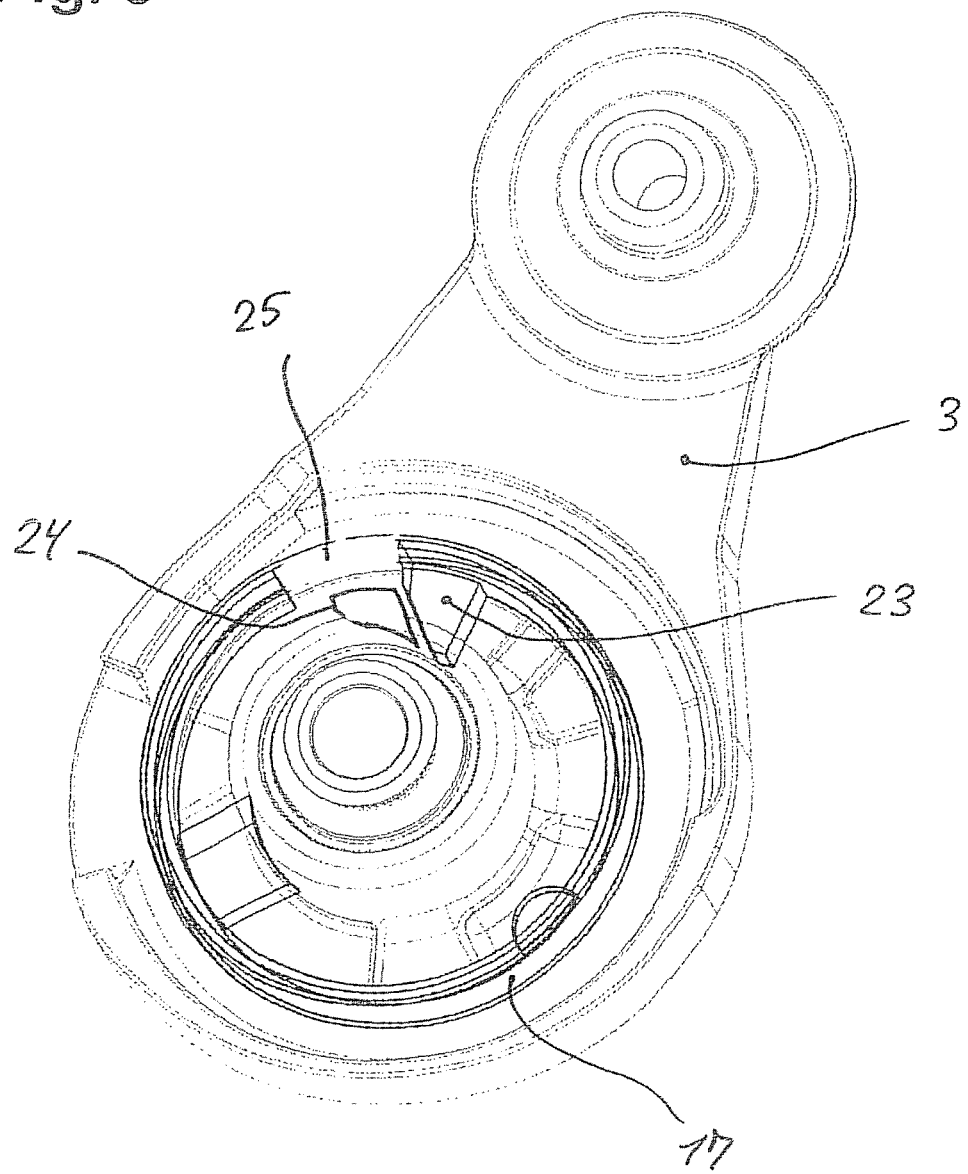

FIG. 3 clearly shows the installation position of the friction ring 17 of the damping device 13. A wedge 23 that is connected integrally to the friction ring 17 and is directed inward in the radial direction is supported with a positive-fit on a wedge surface of a projection 24 extending in the axial direction. The spring means 12 provides a non-positive support. This spring applies a force on the wedge 23 on the side facing away from the projection 24 by means of a spring end 16. An adjustment movement of the pivot arm 3 directed opposite the pre-tensioning of the traction mechanism produces an increased torsional force of the spring means 12, with the spring means 12 expanding in the radial direction and a force component directed outward in the radial direction exerting a force on the wedge 23 by means of the spring end 16. The friction ring 17 with a joint 25 is therefore supported with an increased contact force on the inner wall of the base part 2, for realizing a high damping.

Figure 4:
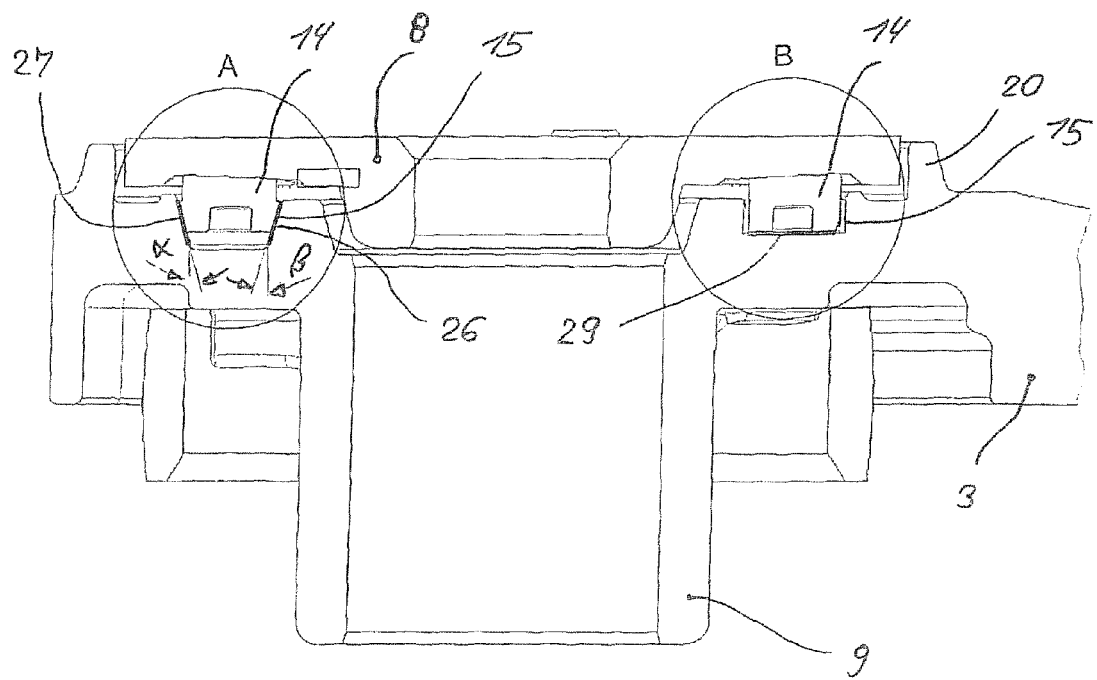

FIG. 4 shows in an enlarged view the installation position of the friction disk 14. According to the detail "A", the friction disk 14 forms an inner cone 26 and an outer cone 27 that engage with a positive-fit in the receptacle 15. The effect of the damping device 13 can be influenced, in particular, by the flank angles "α" and "β" of the inner cone 26 and the outer cone 27. For achieving a certain elasticity or weight saving, the friction disk 14 comprises, on the side of the pivot arm, a recess 28 that is arranged as a partially or completely surrounding groove. As an alternative to flank friction, variant "B" shows an axial surface friction of the friction disk 14. For this purpose, an end surface of the friction disk 14 forms a friction surface together with a contact surface 29 of the receptacle 15 extending in the radial direction.

LIST OF REFERENCE NUMBERS

1 Tensioning device
2 Base part

3 Tensioning arm
4 Receptacle
5 Pin
6 End section
7 End section
8 Support disk
9 Hub
10 Sliding bearing
11 Tensioning roller
12 Spring means
13 Damping device
14 Friction disk
15 Receptacle
16 Spring end
17 Friction ring
18 Lateral surface
19 Inner wall
20 Rim
21 Annular gap
22 Sealing element
23 Wedge
24 Projection
25 Separating gap
26 Inner cone
27 Outer cone
28 Recess
29 Contact surface

The invention claimed is:

1. Tensioning device of a traction mechanism drive, comprising a base part that is fixed in place, a pivot arm that is allocated to said base part and can pivot about a rotary bearing that includes a hub, a pin of the base part, and a sliding bearing, and a spring that is inserted between the base part and the pivot arm exerts an expansion force and provides a non-positive support of a tensioning roller that is connected to the pivot arm on a traction mechanism, and includes a damping device that damps adjusting movements of the pivot arm, the pin of the rotary bearing is fixed with one end in the base part and with the other end in a support disk and the damping device comprises two separate spring-loaded friction elements, including: a friction disk that is supported with a positive-fit on the support disk connected to the pin of the base part and a friction-fit on the pivot arm, and a friction ring that surrounds a spring end of the spring and is fixed on the pivot arm and is supported with a friction-fit on an inner wall of the base part, wherein the friction ring includes a joint that is supported with a lateral surface with a friction-fit on the inner wall of the base part, and the friction ring has a wedge that is directed inward in the radial direction and is inserted in an operating state between a wedge surface of a projection of the pivot arm extending in the axial direction and a spring end of the spring.

2. Tensioning device according to claim 1, wherein the friction disk engages with the support disk by gearing.

3. Tensioning device according to claim 1, wherein the friction disk forms, on a side of the pivot arm, at least one friction surface that is at least one of directed in a radial direction, tapered conically, or is directed in an axial direction.

4. Tensioning device according to claim 3, wherein the friction disk engages with at least one of an inner cone or an outer cone in a correspondingly shaped axial receptacle of the pivot arm.

5. Tensioning device according to claim 4, wherein the inner cone and the outer cone of the friction disk have flank angles that match each other.

6. Tensioning device according to claim 1, wherein the joint of the friction ring is supported with at least one friction block with a friction-fit on the inner wall of the base part.

7. Tensioning device according to claim 1, wherein PA 46 with a chemically linked PTFE additive is provided as a material for at least one of the friction disk or for the friction ring.

8. Tensioning device according to claim 1, wherein the pin forms stepped end sections on two sides, with said stepped end sections being fit as a joint assembly in a bore of the base part or the support disk and being attached with at least one of a non-positive or material-fit.

9. Tensioning device according to claim 6, wherein components directly or indirectly forming the rotary bearing, the base part, the pivot arm, the pin, and the support disk are made from the same materials.

10. Tensioning device according to claim 1, wherein the pivot arm forms a collar that extends in the axial direction and surrounds the support disk on an outside while forming an annular gap.

11. Tensioning device according to claim 10, wherein a sealing element is inserted in the annular gap between the collar of the pivot arm and the support disk for sealing the damping device.

12. Tensioning device according to claim 1, wherein the tensioning roller is positioned on the pivot arm at an end on a side directed toward the base part.

13. Tensioning device according to claim 2, wherein the gearing is Hirth gearing.

* * * * *